April 14, 1959 R. WEISS 2,882,323
HYDROCHLORINATION OF MYRCENE
Filed July 11, 1957 5 Sheets-Sheet 2
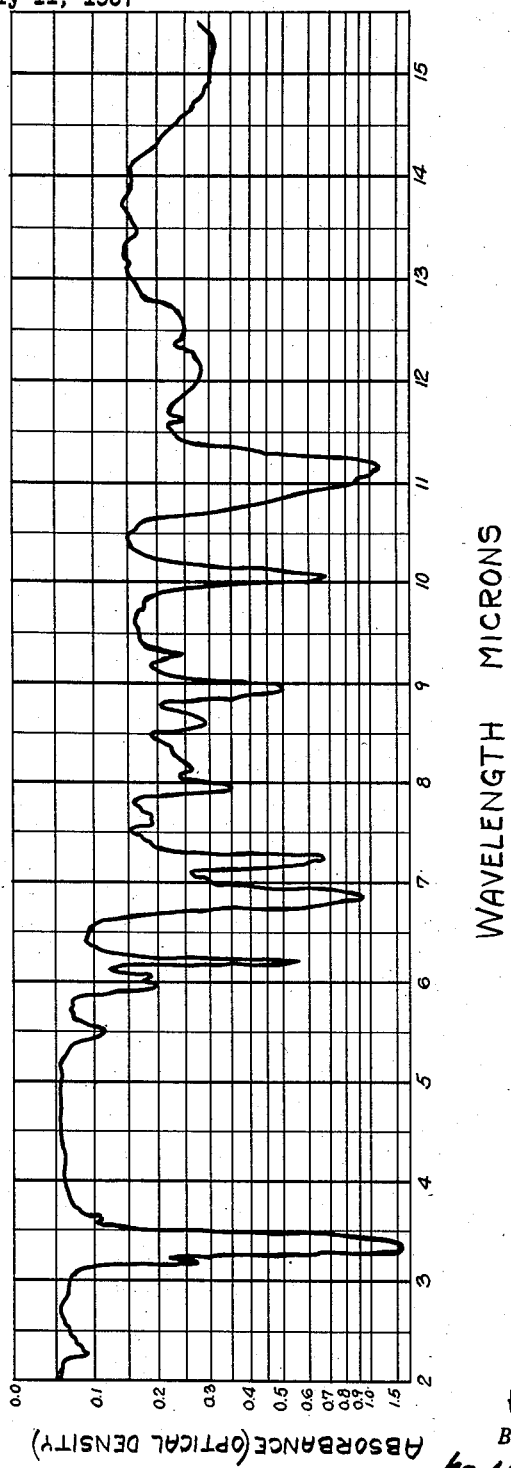
INVENTOR.
RICHARD WEISS
BY
ATTORNEYS April 14, 1959 R. WEISS 2,882,323
HYDROCHLORINATION OF MYRCENE
Filed July 11, 1957 5 Sheets-Sheet 3
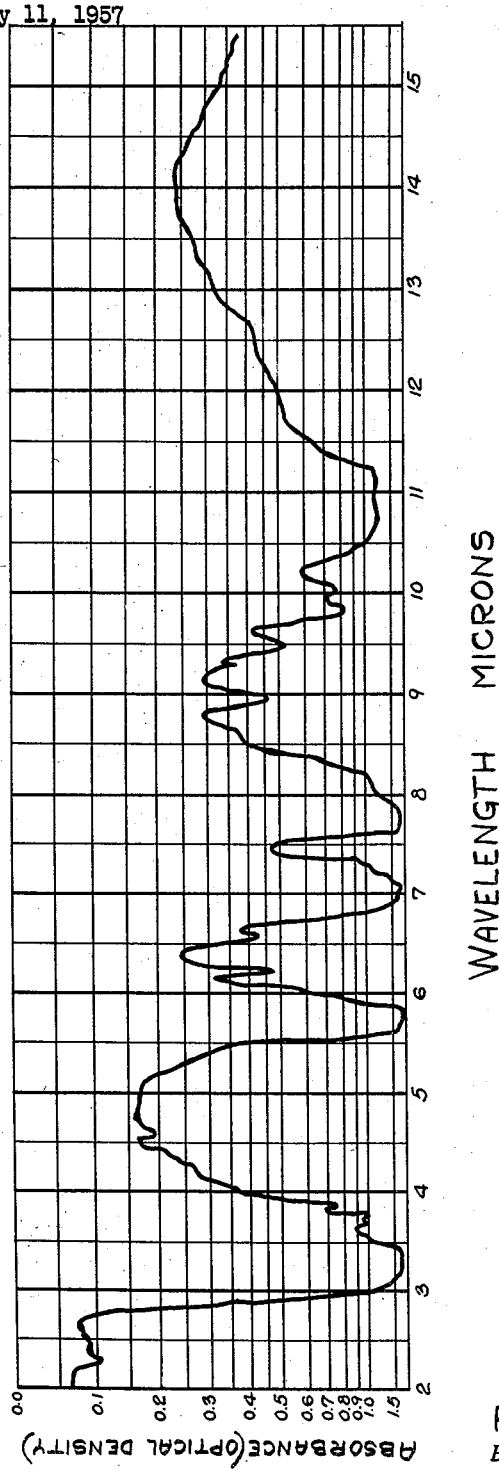
Fig. 3. (MYRCENE + HCl — NO CATALYST — TEST 15)
(ACCORDING TO U.S. PAT. 2,609,388)
INVENTOR.
RICHARD WEISS
BY
ATTORNEYS

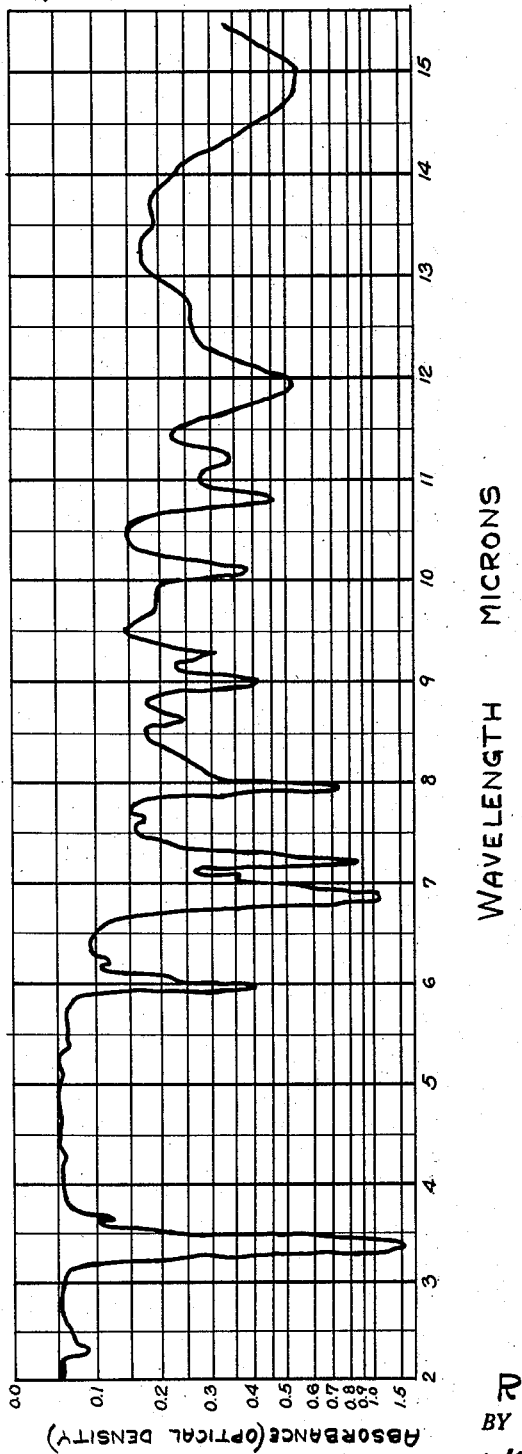

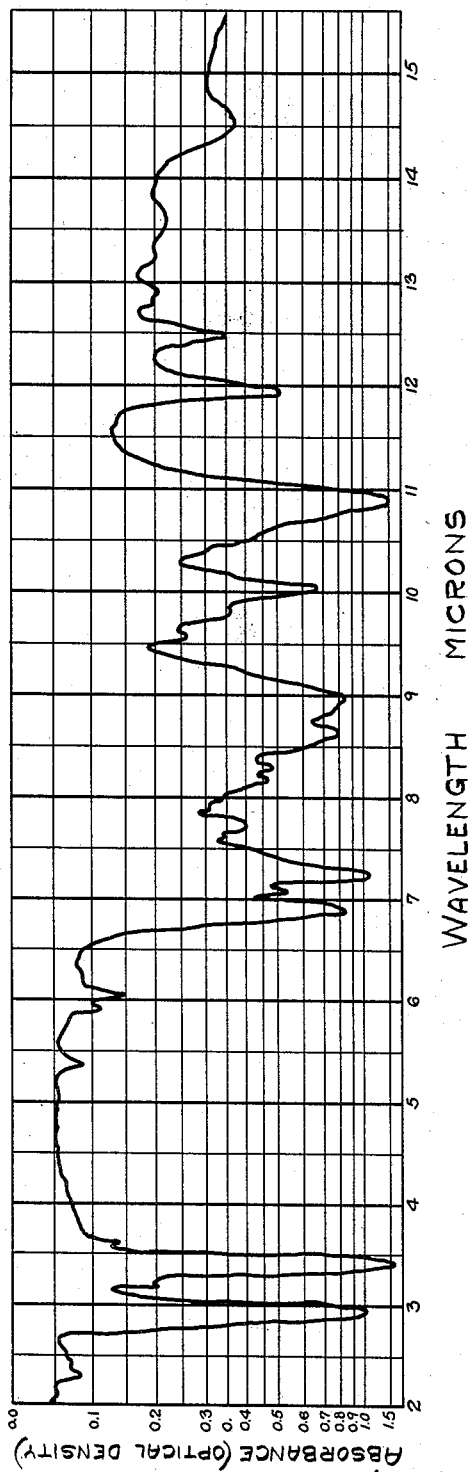

April 14, 1959 R. WEISS 2,882,323
HYDROCHLORINATION OF MYRCENE
Filed July 11, 1957 5 Sheets-Sheet 5
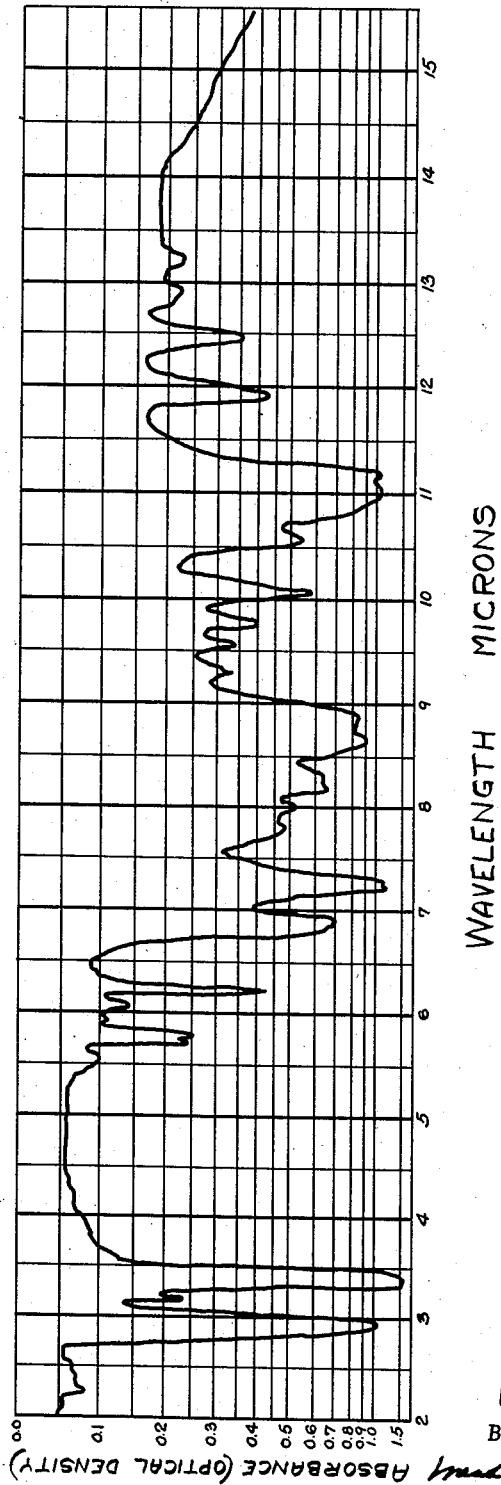
INVENTOR.
RICHARD WEISS
BY
ATTORNEYS 2,882,323

HYDROCHLORINATION OF MYRCENE

Richard Weiss, Brooklyn, N.Y., assignor to Van Amer-ingen-Haebler, Inc., New York, N.Y., a corporation of New York Application July 11, 1957, Serial No. 671,248

8 Claims. (Cl. 260—631.5)

This invention relates to hydrochlorination of myrcene and treatment of the resultant products.

The principal object of the invention is to provide a simple, efficient process for such hydrochlorination and treatment.

The invention accordingly comprises the novel processes and steps of processes specific embodiments of which are described hereinafter by way of example, and in accordance with which I now prefer to practice the invention.

It has heretofore been proposed to hydrochlorinate myrcene. In the patent to Knapp et al., 2,609,388, the hydrochlorination of myrcene is described, and the statement is made that "the hydrogen halide adds preferentially at one of the double bonds in the conjugated portion of the myrcene, giving mainly geranyl, neryl and linalyl halides." I have found that the product obtained in accordance with said patent contains 50 to 60% of conjugated diene. This is shown clearly by the infrared spectrum of the product, which is referred to below in Fig. 3 of the drawings.

I have found in accordance with my invention that I may hydrohalogenate myrcene in the presence of a copper catalyst having a valency of less than 2, and including metallic copper, which has a valency of zero, to produce myrcene hydrohalide, where the hydrogen halide is combined in the conjugated system. The product contains less than 15 and usually not over 3% of conjugated diene.

The hydrohalogen which I prefer to use is hydrogen chloride, although hydrogen bromide may be employed instead thereof. The copper preferred is copper bronze, though other forms of metallic copper may be used, as well as compounds having a valency less than 2, such as cuprous chloride, cuprous oxide, or cuprous bromide. The course of the reaction is as follows:

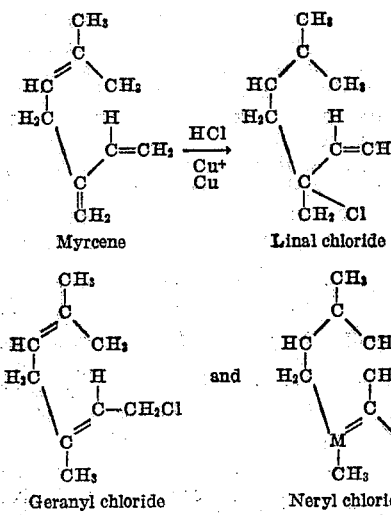
Myrcene → Linal chloride
Geranyl chloride    Neryl chloride

A different reaction occurs when the process is carried out as in Patent 2,609,388, without a catalyst producing large quantities of a substance having conjugated double bonds. Such reaction is represented as follows:

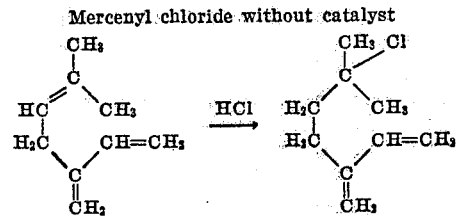
Mercenyl chloride without catalyst

Product of Pat. 2,609,388.
See Fig. 3 of this application.

The product on the right in this reaction is present to the extent of 50 to 60% when the process of said patent is practiced.

The reaction of my invention carried out for the production of myrcene hydrochloride in which the hydrogen chloride is added to the conjugated system is preferably conducted at a temperature of $-10$ to $-3°$ C. under substantially anhydrous conditions. The reaction is preferably carried out without a solvent.

The above reaction of my invention, employing as a catalyst, copper in the form of metallic copper or a univalent copper compound, is unique, resulting in higher yields of the desired product. For comparison, other substances have been employed in the hydrochlorination of myrcene, described in the chart below. But all of these other substances give results widely different from those obtained with the copper catalyst mentioned.

The products resulting from the hydrochlorination of myrcene to introduce the hydrogen chloride into the conjugated system, in accordance with my invention, may be hydrolyzed to produce linalool and small amounts of geraniol, each of which is a valuable perfume. In addition, the hydrochlorinated compound of my invention may be directly reacted with an alkali metal salt of a lower fatty acid such as acetic, propionic or butyric acids, to form geranyl and/or neryl esters. The reaction for this is as follows:

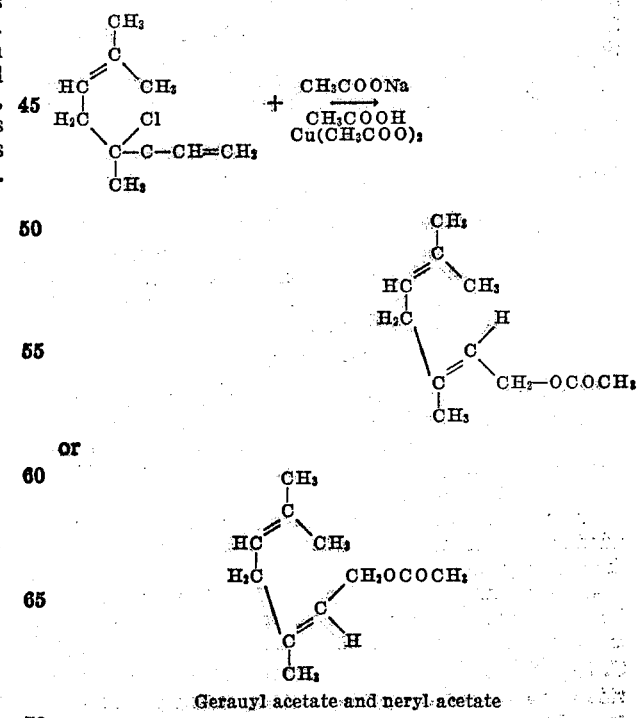

Geranyl acetate and neryl acetate

The following are examples of the way in which I now prefer to practice the invention. It is to be understood that these examples are illustrative, and that the invention is not to be considered as restricted thereto, except as indicated in the appended claims. All parts given in the examples below are by weight.

EXAMPLE 1

In a 120 gallon glass-lined kettle brine-jacketed, equipped with a stirrer, thermometer, gas inlet and outlet tube, trap and flowmeter, was placed.

700 pounds beta-pinene pyrolizate containing about 75% myrcene and about 25% limonene
3 pounds copper powder
1 pound hydroquinone The mixture was cooled to −10° C.

A current of substantially anhydrous hydrogen chloride was passed into the liquid with continuous stirring, maintaining a temperature of −10 to −3° C. 150 pounds of hydrogen chloride were absorbed over a period of 15 hours.

At this rate no hydrogen chloride escaped through the gas outlet.

The crude reaction mixture contains about 600 pounds of myrcene hydrochloride, identified as such, which is worked up as follows:

To a stirred mixture of 2,000 pounds of water, 260 pounds of calcium carbonate powder and 38 pounds of copper acetate, contained in a kettle equipped with a reflux condenser, is added the crude reaction mixture from the hydrochlorination. The whole is stirred at room temperature as long as carbon dioxide is evolved, and heat is then applied as necessary to complete the evolution of the carbon dioxide at a moderate rate. The temperature thus rises gradually to the reflux point and reflux is continued for about 8 hours. This hydrolysis process results in approximately 700 pounds of a reaction product containing about 35% linalool, about 20% terpineol, and 5% geraniol, about 5% unhydrolyzed hydrochlorinated products, and the remainder terpene hydrocarbons containing limonene.

This product is then steam distilled to separate the reaction product mentioned from the aqueous slurry containing same. The steam distillate is separated from its components by careful fractional distillation. With sufficiently careful fractional distillation the components of the mixture are separated in approximately the proportions mentioned.

The linalool, terpineol and geraniol have been identified, and correspond to commercial products made under these names.

I have carried out the identical reaction above except for the substitution of cuprous oxide for metallic copper with substantially the same results. In that case I found that after the hydrochloric acid had been passed into the myrcene mixture for a time it was decomposed to form copper chloride and metallic copper. Hydrobromic acid acts in the same way. Hydroquinone is used only to prevent polymerization.

EXAMPLE 2

The process was carried out under substantially the same conditions as in Example 1. The myrcene employed is approximately 90% pure, but otherwise contains substantially the same impurities as the 75% myrcene of Example 1.

The substances mentioned in the tests have been identified and correspond to commercial products made under the names given.

454 parts myrcene (90% pure), 1 part hydroquinone, 2.3 parts copper bronze powder, were mixed and cooled to −11° C. While maintaining a temperature of −11° C. to −5° C., 113.5 parts of anhydrous hydrogen chloride was added with vigorous stirring, taking precautions to exclude moisture.

This mixture was added to a slurry of 225 parts calcium carbonate, 26 parts copper acetate, and 1.125 parts water.

The mass was stirred at room temperature for 2 hours and then refluxed for 8 hours.

The product was separated by steam distillation. An infrared test of the crude distillate showed that practically no conjugated system was present.

The oil layer was then fractionally distilled in vacuum of 2 mm., giving the following cuts:

(1) Boiling point 32–45° C. at 2 mm. Was principally terpene hydrocarbons with minor amounts of hydrochlorination products.

(2) Boiling point 45–57° C. at 2 mm. Consisted principally of technical linalool, and had a refractive index at 20° C. of 1.4624, with minor amounts of impurities.

(3) Boiling point 57–58° C. at 2 mm. Consisted of technical terpineol.

(4) Boiling point 58–60° C. at 2 mm. Consisted of technical geraniol and nerol.

EXAMPLE 3

This example was carried out under substantially the same conditions as Example 1, using a myrcene which is approximately 76% pure. The catalyst employed was cuprous chloride.

350 parts myrcene (76% pure), 1 part hydroquinone, 2.4 parts cuprous chloride were mixed and cooled to −10° C. While maintaining a temperature of −10° C. to 0° C., 75 parts anhydrous hydrogen chloride was added, taking precaution to exclude moisture. The crude reaction mixture contained linalyl chloride with small amounts of geranyl and neryl chloride.

The mixture is worked up in the same manner as in Example 1 to produce linalool, geraniol and nerol.

EXAMPLE 4

1,000 parts of myrcene (76% pure) in 1,000 parts of glacial acetic acid, 3 parts of hydroquinone, and 5 parts of copper bronze were mixed and cooled to 8° C. While maintaining a temperature of 8° to 15° C., 234 parts of anhydrous hydrogen chloride was added with vigorous stirring. Then 628 parts of anhydrous sodium acetate and 10 parts of copper acetate were added. The mixture was stirred and refluxed for 9 hours. The mixture was poured on ice. The oil layer was separated and washed with water and then with a 5% sodium carbonate solution, and the product was distilled in high vacuum, about 2 mm. mercury.

The following fractions were obtained:

(1) Boiling point 36–72° C., 499 parts principally terpene hydrocarbons and hydrochlorination products.

(2) Boiling point 72–95° C. at 2 mm., 429 parts geranyl and neryl acetate testing 80% by saponification with 20% of geraniol, nerol and other impurities, which mixture is a perfume having the characteristic odor of a combination of the acetates mentioned. $N_D^{20}=1.4710$ to $1.4720$.

In order to demonstrate the widely different results obtained by the metallic copper or univalent copper compound used as catalysts in accordance with my invention, I have made a number of runs of the process under exactly the same conditions, employing the catalysts of my invention as compared with other substances, and the results are given in the table below. All of the tests were made under conditions given in the above examples, the temperature employed being −15 to −30° C., using 0.2% hydroquinone. The weights of myrcene, hydrogen chloride and catalyst are given under these headings. In the last column of the table the percentage of conjugated diene is given, which as stated in the footnote, was determined from the intensity of the infrared absorption at $6.23\mu$ of the reaction product. It will be noted that in the table no solvent was used, except in Tests 15 and 16. These tests were made in accordance with Examples 4 and 3 respectively of the Knapp Patent 2,609,388.

It will be noted that Tests 1 and 3 correspond substantially with Examples 2 and 3, respectively, of the present application.

It will be noted from the tests in the table that in Tests 1 to 4, inclusive, where the copper catalysts of the type employed by me are used in accordance with my invention, there is no substantial percentage of conjugated diene, whereas in all of the other tests employing different substances or no catalyst, the percentage of conjugated diene remaining after hydrochlorination ranges from 40 to 70%. It is to be noted that myrcene is well known as a substance having three double bonds, two of which are conjugated and the third is isolated. Linalool, the product referred to in Example 1 and elsewhere, is a substance in which no conjugated double bonds exist, as is well known.

Table

| Tests, No. | Myrcene | Solvent | HCl | Catalyst | Percent Conjugated diene [1] |
|---|---|---|---|---|---|
| 1 (Ex. 2) | 454 (90%) | None | 113.5 | Copper Bronze (90% Cu), 2.3. | 3 |
| 2 | 350 (76%) | do | 75 | Copper Bronze, 1.7 | 5 |
| 3 (Ex. 3) | 350 (76%) | do | 75 | Cuprous Chloride, 2.4 CuCl. | 3 |
| 4 | 204 (77%) | do | 42 | Cuprous Oxide, 1.0 Cu₂O. | 15 |
| 5 | 350 (76%) | do | 72 | Cupric Chloride, 4.1 CuCl₂. | ca. 40 |
| 6 | 350 (76%) | do | 70.7 | 2 Raney prepared nickel. | ca. 60 |
| 7 | 204 (77%) | do | 39.4 | Nickelous Chloride, 1 NiCl₂. | ca. 60 |
| 8 | 204 (77%) | do | 41.5 | Cobaltous Chloride, 1 CoCl₂. | ca. 70 |
| 9 | 204 (77%) | do | 43.3 | Platinum 5 (10% on asbestos). | ca. 50 |
| 10 | 204 (77%) | do | 42 | Palladium Chloride, 1 PdCl₂. | ca. 50 |
| 11 | 204 (77%) | do | 38.5 | Silver Chloride, 1 AgCl. | ca. 60 |
| 12 | 204 (77%) | do | 41.5 | Lead Chloride, 1 PbCl₂. | ca. 58 |
| 13 | 204 (77%) | do | 42 | Lithium Chloride, 0.9 LiCl. | ca. 50 |
| 14 | 544 (72%) | do | 121 | None | ca. 50 |
| 15 | 204 (76%) | 204 Acetic Acid | 42 | do | 50 |
| 16 | 204 (76%) | 127.5 CHCl₃ | 41 | do | 60 |

[1] As determined from intensity of infrared absorption at 6.23μ of the reaction product shown on spectrograms of each product listed in this column.

The results of some of these tests showing the percentage of conjugated diene are graphically shown on the accompanying drawings forming part of this application, in which:

Fig. 1 shows an infrared spectrogram of myrcene hydrochloride resulting from the treatment of myrcene with hydrochloric acid in the presence of copper bronze as a catalyst, in accordance with Test 1.

Fig. 2 shows an infrared spectrogram of myrcene hydrochlorinated in the presence of cobaltous chloride as a catalyst, in accordance with Test 8 in the above table, and showing ca. (about) 70% conjugated diene.

Fig. 3 shows an infrared spectrogram of myrcene hydrochlorinated in the presence of acetic acid in accordance with Example 4 of the Knapp Patent 2,609,388 (Test 15), and showing ca. (about) 50% conjugated diene.

Fig. 4 shows an infrared spectrogram of the alcohol section of synthetic linalool made in accordance with Example 1 of the present application. It shows that no system of conjugated double bonds is present; and Fig. 5 is an infrared spectrogram of an alcohol section prepared from myrcene hydrochloride, without the catalyst employed in my invention according to Test 14. It shows that a system of conjugated double bonds is still present, the main product being myrcenol.

Similar infrared spectrograms to those shown in the drawings have been prepared of all other tests shown in the table, and the percentage of conjugated diene in each of the resulting products mentioned in said table has been taken from these spectrograms.

This application is a continuation-in-part of my application Serial No. 520,138, filed July 5, 1955, and now abandoned.

I claim:

1. A process which comprises treating myrcene with a hydrogen halide selected from the group consisting of hydrogen chloride and hydrogen bromide, in the presence of a catalyst selected from the group consisting of metallic copper and a univalent copper compound under substantially anhydrous conditions, and adding the hydrogen halide to the myrcene to form myrcene hydrohalide, in which the hydrogen halide is added to the conjugated diene system, to produce a product having no more than 15% of conjugated diene.

2. A process which comprises treating myrcene with a hydrogen halide selected from the group consisting of hydrogen chloride and hydrogen bromide, in the presence of a catalyst containing a cuprous compound under substantially anhydrous conditions, adding the hydrogen halide to the myrcene to form myrcene hydrohalide, in which the hydrogen halide is added to the conjugated diene system to produce a product having no more than 15% of conjugated diene, and hydrolyzing the resulting myrcene hydrohalide with the production of at least one of the substances linalool, geraniol and nerol.

3. A process which comprises treating myrcene with a hydrogen halide selected from the group consisting of hydrogen chloride and hydrogen bromide, in the presence of a catalyst containing a cuprous halide under substantially anhydrous conditions, and adding the hydrogen halide to the myrcene to form myrcene hydrohalide, in which the hydrogen halide is added to the conjugated diene system, to produce a product having no more than 15% of conjugated diene.

4. A process which comprises treating myrcene with a hydrogen halide selected from the group consisting of hydrogen chloride and hydrogen bromide, in the presence of a catalyst containing cuprous chloride and copper powder under substantially anhydrous conditions, and adding the hydrogen halide to the myrcene to form myrcene hydrohalide, in which the hydrogen halide is added to the conjugated diene system, to produce a product having no more than 15% of conjugated diene.

5. A process which comprises treating myrcene with hydrogen chloride in the presence of metallic copper as a catalyst under substantially anhydrous conditions, and adding the hydrogen chloride to the myrcene to form myrcene hydrochloride, in which the hydrogen chloride is added to the conjugated diene system, to produce a product having no more than 15% of conjugated diene.

6. A process which comprises treating myrcene with hydrogen chloride in the presence of cuprous oxide as a catalyst under substantially anhydrous conditions, and adding the hydrogen chloride to the myrcene to form myrcene hydrochloride, in which the hydrogen chloride is added to the conjugated diene system, to produce a product having no more than 15% of conjugated diene.

7. A process which comprises treating myrcene with hydrogen chloride in the presence of metallic copper as a catalyst at a temperature of $-10°$ C. to $-3°$ C. under substantially anhydrous conditions, and adding the hydrogen chloride to the myrcene to form myrcene hydrochloride, in which the hydrogen chloride is added to the conjugated diene system to produce a product having no more than 15% of conjugated diene.

8. A process which comprises treating myrcene with hydrogen chloride in the presence of metallic copper as a catalyst under substantially anhydrous conditions, adding the hydrogen chloride to the myrcene to form myrcene hydrochloride, in which the hydrogen chloride is added to the conjugated diene system to produce a product having no more than 15% of conjugated diene, and hydrolyzing the myrcene hydrochloride to produce linalool.

References Cited in the file of this patent

UNITED STATES PATENTS

| | | |
|---|---|---|
| 2,246,547 | Soday | June 24, 1941 |
| 2,310,283 | Gilliland | Feb. 9, 1943 |
| 2,328,275 | Heard | Aug. 31, 1943 |
| 2,609,388 | Knapp et al. | Sept. 2, 1952 |
| 2,618,614 | Bielawski et al. | Nov. 18, 1952 |
| 2,794,826 | Bell et al. | June 4, 1957 |

FOREIGN PATENTS

| | | |
|---|---|---|
| 435,858 | Great Britain | Oct. 1, 1935 |
| 532,614 | Great Britain | Jan. 28, 1941 |

OTHER REFERENCES

Carothers et al.: J. Am. Chem. Soc. 54, 4066–70 (1932).

Carothers et al.: J. Am. Chem. Soc. 55, 786–788 (1933).

Kharasch et al.: J. Am. Chem. Soc. 62, 2047–51 (1940).

UNITED STATES PATENT OFFICE
Certificate of Correction

Patent No. 2,882,323

April 14, 1959

Richard Weiss

It is hereby certified that error appears in the printed specification of the above numbered patent requiring correction and that the said Letters Patent should read as corrected below.

Column 1, line 23, for "prefere" read —prefer—; lines 50 to 69, the formula should read as shown below instead of as in the patent:

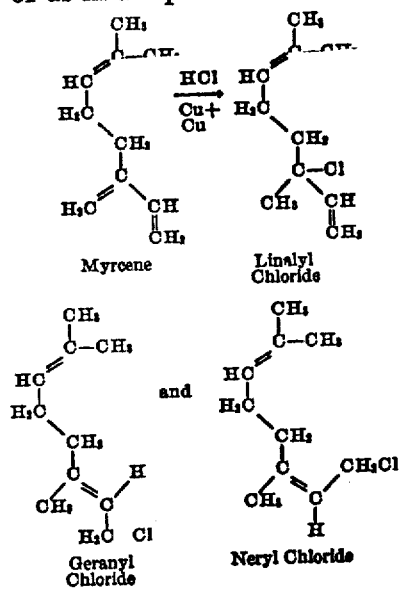

Column 2, lines 3 to 12, the formula should appear as shown below instead of as in the patent:

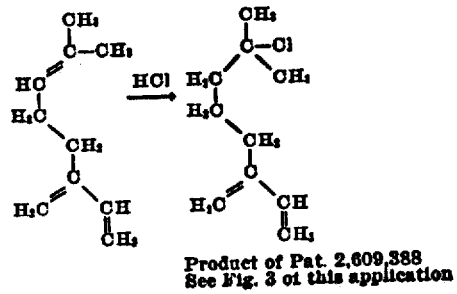

same column 2, lines 42 to 69, the formula should appear as shown below instead of as in the patent:

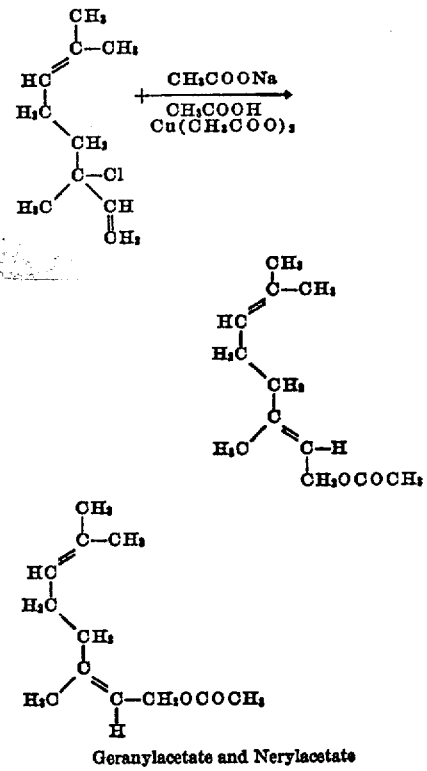

Geranylacetate and Nerylacetate

Signed and sealed this 15th day of March 1960.

[SEAL]

Attest:
KARL H. AXLINE,
*Attesting Officer.*

ROBERT C. WATSON,
*Commissioner of Patents*